United States Patent
Petrocelli

(10) Patent No.: US 8,370,305 B2
(45) Date of Patent: Feb. 5, 2013

(54) METHOD OF MINIMIZING THE AMOUNT OF NETWORK BANDWIDTH NEEDED TO COPY DATA BETWEEN DATA DEDUPLICATION STORAGE SYSTEMS

(75) Inventor: Robert Petrocelli, Westerly, RI (US)

(73) Assignee: Greenbytes, Inc., a Rhode Island corporation, Ashaway, RI (US)

( * ) Notice: Subject to any disclaimer, the term of this patent is extended or adjusted under 35 U.S.C. 154(b) by 30 days.

(21) Appl. No.: 13/088,447

(22) Filed: Apr. 18, 2011

(65) Prior Publication Data

US 2011/0258239 A1    Oct. 20, 2011

Related U.S. Application Data

(60) Provisional application No. 61/325,442, filed on Apr. 19, 2010, provisional application No. 61/325,450, filed on Apr. 19, 2010.

(51) Int. Cl.
    *G06F 7/02*       (2006.01)
    *G06F 17/30*      (2006.01)

(52) U.S. Cl. ........ 707/647; 707/667; 707/698; 707/797; 707/640

(58) Field of Classification Search ........... 707/999.001, 707/999.102, 999.107, 999.2, 610, 640, 647, 707/692, 698, 769, 797, 822, 823, 667; 709/200; 711/162

See application file for complete search history.

(56) References Cited

U.S. PATENT DOCUMENTS

| | | | |
|---|---|---|---|
| 6,470,329 B1 * | 10/2002 | Livschitz | 1/1 |
| 7,567,188 B1 | 7/2009 | Anglin et al. | |
| 7,756,826 B2 * | 7/2010 | Bots et al. | 707/624 |
| 2005/0004954 A1 * | 1/2005 | Soule, III | 707/203 |
| 2008/0244204 A1 | 10/2008 | Cremelie et al. | |
| 2008/0301134 A1 | 12/2008 | Miller et al. | |
| 2009/0259701 A1 | 10/2009 | Wideman et al. | |
| 2010/0077161 A1 * | 3/2010 | Stoakes et al. | 711/162 |
| 2011/0078112 A1 * | 3/2011 | Takata et al. | 707/622 |
| 2011/0258161 A1 * | 10/2011 | Constantinescu et al. | 707/640 |
| 2012/0017060 A1 * | 1/2012 | Kapanipathi et al. | 711/162 |

* cited by examiner

*Primary Examiner* — Bruce Moser

(74) *Attorney, Agent, or Firm* — Barlow, Josephs & Holmes, Ltd.

(57) ABSTRACT

A method and system is provided for copying data between two deduplicating storage systems. A list of unique fingerprints is compiled from the data which will be sent. This list is transmitted to the receiving system during a preliminary data exchange called the preamble. The receiving system replies with a second list which contains the unique fingerprints of the data which either needs to be sent or can be omitted. Which list depends on the size of the list where the smaller list is sent for efficiency and lower bandwidth consumption. A reference list of duplicate blocks being sent is retained on the receiving system until the copy operation is complete. This reference list is used to protect blocks on the receiving system by deferring deletions until the incoming hallow block can reference the duplicate block on the receiver to confirm that is on the target system and should not be deleted.

12 Claims, 1 Drawing Sheet

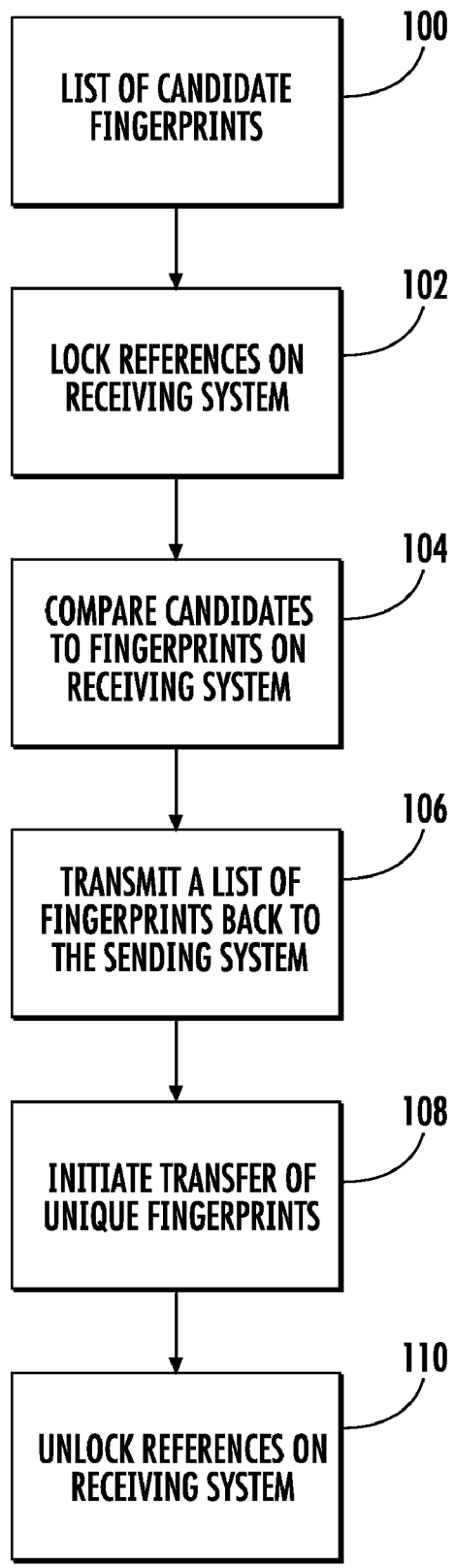

METHOD OF MINIMIZING THE AMOUNT OF NETWORK BANDWIDTH NEEDED TO COPY DATA BETWEEN DATA DEDUPLICATION STORAGE SYSTEMS

CROSS REFERENCE TO RELATED APPLICATION

The present patent document claims priority to earlier-filed U.S. Provisional Application Ser. No. 61/325,442, filed on Apr. 19, 2010, and U.S. Provisional Application Ser. No. 61/325,450, filed on Apr. 19, 2010, the entire contents of which are incorporated herein by reference.

BACKGROUND OF THE INVENTION

The present invention relates generally to a method for a method for moving data between two of more data storage systems. The present invention relates to such a method that is implemented in computer software code running on computer hardware.

The operation of computers are very well known in the art. File systems exist on a computer or across multiple computers, where each computer typically includes data storage, such as a hard disk or disk(s), random access memory (RAM) and an operating system for executing software code. Software code is typically executed to carry out the purpose of the computer. As part of the execution of the computer code, storage space on the hard disk or disks and RAM are commonly used. Also, data can be stored, either permanently or temporarily on the hard disk or disks and in RAM. The structure and operation of computers are so well known in the art that they need not be discussed in further detail herein.

In the field of computers and computing, file systems are also very well known in the art to enable the storage of such data as part of the use of the computer. A computer file system is a method for storing and organizing computer files and the data they contain to make it easy to find and access them. File systems may use data storage devices such as a hard disks or CD-ROMs and involve maintaining the physical location of the files, and they might provide access to data by the computer operating system or on a file server by acting as clients for a network protocol (e.g., NFS, SMB, or 9P clients). Also, they may be virtual and exist only as an access method for virtual data.

More formally, a file system is a special-purpose database for the storage, organization, manipulation, and retrieval of data. This database or table which centralizes the information about which areas belong to files, are free or possibly unusable, and where each file is stored on the disk. To limit the size of the table, disk space is allocated to files in contiguous groups of hardware sectors called clusters. As disk drives have evolved, the maximum number of clusters has dramatically increased, and so the number of bits used to identify each cluster has grown. For example, FAT, and the successive major versions thereof are named after the number of table element bits: 12, 16, and 32. The FAT standard has also been expanded in other ways while preserving backward compatibility with existing software.

File systems are specialized databases which manage information on digital storage media such as magnetic hard drives. Data is organized using an abstraction called a file which consists of related data and information about that data (here after referred to as metadata). Metadata commonly consists of information like date of creation, file type, owner, and the like.

The file system provides a name space (or a system) for the unique naming of files. File systems also frequently provide a directory or folder abstraction so that files can be organized in a hierarchical fashion. The abstraction notion of file and folders does not represent the actual physical organization of data on the hard disk only its logical relationships.

Hard disks consist of a contiguous linear array of units of storage referred to as blocks. Blocks are all typically the same size and each has a unique address used by the disk controller to access the contents of the block for reading or writing. File systems translate their logical organization into the physical layer by designating certain address as special or reserved. These blocks, often referred to as super-blocks, contain important information about the file system such as file system version, amount of free space, etc. They also contain or point to other blocks that contain structures which describe directory and file objects.

One of the most important activities performed by the file system is the allocation of these physical blocks to file and directory objects. Typically each file consists of one or more data blocks. If files are stored on the file-system which contains identical data blocks, no provision is made to identify that these blocks are duplicates and avoid the allocation of (wasted) space for these duplicate blocks.

When data is moved between two or more data storage systems, it is common that the storage space used to store information on both the sending and receiving data storage systems are optimized utilizing a data deduplication technique. Data deduplication is a method in which only unique data is physically kept in a data storage system. However, known deduplication techniques are inefficient and result in the transfer of unnecessary data blocks. For example, in the prior art, unique data is referenced by a unique "fingerprint" derived from the data often in the form of a cryptographic hash function. Deduplication methods compare the fingerprint of incoming data blocks to the fingerprints of all existing data blocks. If the incoming data block is unique it is stored, if it is not unique it is not stored but is added as a reference to the existing unique data block. When data is copied from one system to another there is a probability that the data being copied is already stored in a data block on the receiving system. This method relates to the process of sending data in a manner in which only unique data blocks are transferred from the sender to the receiver. In this context, unique blocks are blocks that are already stored on the receiving system (e.g. via prior transactions with other systems).

Therefore, there is a need to eliminate the need to send duplicate blocks to significantly reduce the time and network resources needed to accomplish the data transfer.

SUMMARY OF THE INVENTION

The present invention preserves the advantages of prior art methods, devices and systems for minimizing the amount of network bandwidth needed to copy data between storage systems that employ data deduplication. In addition, it provides new advantages not found in currently available methods, devices and systems therefor and overcomes many disadvantages of such currently available methods, devices and systems.

The method of the present invention enables data to be copied efficiently between two data systems that employ data deduplicating. The present invention uniquely compiles a list of unique fingerprints from the data on the source storage location from which the data will be sent. This list is transmitted to the receiving target source storage location during a preliminary data exchange called the preamble. The receiving location replies with a second list which contains the unique fingerprints of the data which either needs to be sent or can be omitted, which depends on which list is smaller. A reference list of duplicate blocks being sent is retained on the receiving location until the copy operation is complete. This reference list is used to protect blocks on the receiving system by deferring deletions until the incoming hallow block can reference the duplicate block on the receiver.

Therefore, an object of the invention is to eliminate the need to send duplicate blocks to significantly reduce the time and network resources needed to accomplish the data transfer.

Another object of the invention is to provide a more efficient and optimized method of transferring data between two data storage systems that employ data deduplication.

A further object of the present invention is to reduce the bandwidth required for copying data between two data storage systems that employ data deduplication.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a flow chart showing the process of the present invention.

DETAILED DESCRIPTION OF THE PREFERRED EMBODIMENT

As seen in the attached FIG. 1, details of the preferred embodiment of the method of the present invention are shown.

In accordance with the present invention, bandwidth is minimized by employing a preamble transfer. This preamble transfer is transfer of information about the data to be transferred from a sender storage location ("sender") to a receiver storage location ("receiver") that is executed prior to the primary data transfer.

In the connection with this, arrays are also employed. Arrays are simple lists of values. In accordance with the present invention, arrays may be used to hold a list of unique fingerprints which represent the data about to be sent to the receiver. One problem with arrays is that the data storage needed for them grows linearly with the number of elements in the list. In this case a list of fingerprints has the appearance of a list of random numbers and is not susceptible to common compression techniques such as run length encoding.

Also used are tries. In computer science, a trie, or prefix tree, is an ordered tree data structure that is used to store an associative array where the keys are usually strings. Unlike a binary trees, no node in the tree stores the key associated with that node; instead, its position in the tree shows what key it is associated with. All the descendants of a node have a common prefix of the string associated with that node, and the root is associated with the NULL string. Values are normally not associated with every node, only with leaves and some inner nodes that correspond to keys of interest.

Tries have several advantages simple arrays, the most important in the context of the present invention is that the Trie inherently compresses its keys. In a Trie which is sparsely populated compared to the possible range of its keys the memory required can be as little as 1 bit per key stored. The fingerprints used in deduplication are very sparsely populated. For example, a 256 bit fingerprint has a range of 0 to $2^{256}$, but the number of blocks stored in a large system does not typically exceed $2^{48}$ blocks. In a large copy operation the amount of data being sent via the preamble is significantly smaller using a trie compared to an array.

Moreover, hallow blocks are addressed by the method of the present invention. A hallow block is a user block which is empty. More specifically, during a copy operation between non-deduplication storage systems every data block and its associated meta-data are sent. In deduplicated transmission it is still necessary to send the meta-data blocks, but the user data blocks can be empty if that block is already stored on the target system. It is that user block which is empty, which is referred to as a hallow block.

According to the present invention, a method to encode the fingerprints of the user data to be sent and transmit this data to the receiver, as shown in step 100. The receiver then compares this list to the list of data blocks already stored, in step 104, and returns a second (possibly much smaller) list of unique data blocks which actually need to be sent as shown in step 106. This is called the preamble to the data transmission. This invention relates to the concept of a preamble and to a specific method for structuring the preamble phase. Transfer of the unique data blocks corresponding to the list transmitted back to the sender may then proceed at step 108.

The present invention also employs Trie structures to exchange metadata during the aforementioned preamble transfer. Tries are very space efficient and have low search and insert complexity. A Trie is constructed by the sender consisting of all the data blocks which are candidates for transfer. The receiver compares this a local list of stored blocks and constructs a Trie which is sent back to the sender. This Trie contains a list of unique blocks which need to be sent.

It is also important that blocks are protected during the transfer process. The present method can protect blocks on the receiving system so that they are not prematurely deleted by another process while a data transfer is in process. In the present method, the Trie developed during the preamble on the receiving side is retained and used for reference. Any data deletion attempted on the receiving system must first check the reference Trie. If a delete is requested it will be deferred until the transfer is complete. In this manner, the references are locked as shown in step 102, and then unlocked after completion of the copy operations during step 110. Further, any candidate blocks which are not in the Trie are returned by the receiver during the preamble phase.

For additional bandwidth efficiency, the receiver sends a Trie during the preamble phase. The particular Trie transmission is the smaller of Trie containing the blocks already stored on the receiver and the Trie containing the candidate blocks not already stored on the receiver. This method minimizes the size of the data exchanged during the preamble.

In view of the foregoing, a new and unique method for minimizing the amount of network bandwidth needed to copy data between data storage systems that employ data deduplication.

It should be understood that the present invention may be employed in any type of operating system. The present invention may be implemented in any type of software code using any language and can run on any type of computer hardware. This unique method may also be employed for data stored in any type of storage device, such as arrays of storage devices and any type of device, such as magnetic, solid state (such as flash) and optical media.

It would be appreciated by those skilled in the art that various changes and modifications can be made to the illustrated embodiments without departing from the spirit of the present invention. All such modifications and changes are intended to be covered by the appended claims.

What is claimed is:

1. A method for minimizing the amount of network bandwidth needed to copy data between a first data storage location, employing data deduplication, and a second data storage location, employing data deduplication, said method comprising:
   compiling a first list of unique fingerprints from data to be sent that resides on a first data storage location;
   transmitting the first list from the first storage location to a second storage location;
   based on the first list of unique fingerprints, compiling a second list of unique fingerprints corresponding to a subset of non-duplicative data which needs to be sent and a third list of unique fingerprints corresponding to a subset of duplicative data which needs to be omitted from the transfer;
   determining which of the second list and third list is smaller;
   transmitting the one of the second list and the third list that is smaller from the second storage location to the first storage location; and
   transmitting non-duplicative data from the first storage location to the second storage location based on the one of the second list and the third list that is received.

2. The method of claim 1, further comprising maintaining a list of duplicate blocks on the second data storage location until the termination of the copy operation.

3. The method of claim 2, wherein maintaining a list of duplicate blocks comprises retaining said second list until the termination of the copy operation.

4. The method of claim 2, further comprising deferring deletions of duplicate data on the second storage location until an incoming hallow block can reference a corresponding duplicate block on the second storage location.

5. The method of claim 1, further comprising deferring deletions of duplicate data on the second storage location until an incoming hallow block can reference a corresponding duplicate block on the second storage location.

6. The method of claim 1, wherein compiling said first list of unique fingerprints comprises storing said first list in a trie data structure.

7. The method of claim 1, wherein compiling said second list of unique fingerprints comprises storing said second list in a trie data structure.

8. The method of claim 1, wherein compiling said third list of unique fingerprints comprises storing said third list in a trie data structure.

9. A data storage system, comprising:
   a first data storage location, the first data storage location comprising a computer with a memory, the first storage location employing data deduplication to store data thereon;
   a second data storage location connected to the first data storage location, the second data storage location comprising a computer with a memory, the second storage location employing data deduplication to store data thereon;
   said first data storage location configured and arranged to compile a first list of unique fingerprints from data to be sent that resides on a first data storage location, said first data storage location further configured and arranged to transmit the first list from the first storage location to a second storage location;
   said second storage location further configured and arranged, based on said first list of unique fingerprints, to compile a second list of unique fingerprints corresponding to a subset of non-duplicative data which needs to be sent and a third list of unique fingerprints corresponding to a subset of duplicative data which needs to be omitted from the transfer;
   said second storage location further configured and arranged to determine which of the second list and third list is smaller and transmit the one of the second list and the third list that is smaller from said second storage location to said first storage location; and
   said first storage location configured and arranged to transmit non-duplicative data from the first storage location to the second storage location based on the one of the second list and the third list that is received.

10. The method of claim 9, wherein compiling said first list of unique fingerprints comprises storing said first list in a trie data structure.

11. A computer program product, comprising a non-transitory computer-readable medium having a computer-readable program code embodied therein, said computer-readable program code executed to implement a method for minimizing the amount of network bandwidth needed to copy data between a first data storage location employing data deduplication and a second data storage location employing data deduplication, said method comprising:
   compiling a first list of unique fingerprints from data to be sent that resides on a first data storage location;
   transmitting the first list from the first storage location to a second storage location;
   based on said first list of unique fingerprints, compiling a second list of unique fingerprints corresponding to a subset of non-duplicative data which needs to be sent and a third list of unique fingerprints corresponding to a subset of duplicative data which needs to be omitted from the transfer;
   determining which of the second list and third list is smaller;
   transmitting the one of the second list and the third list that is smaller from the second storage location to the first storage location; and
   transmitting non-duplicative data from the first storage location to the second storage location based on the one of the second list and the third list that is received.

12. The computer program product of claim 11, wherein compiling said first list of unique fingerprints comprises storing said first list in a trie data structure.

* * * * *